(12) United States Patent
Ageheim et al.

(10) Patent No.: US 6,383,587 B1
(45) Date of Patent: May 7, 2002

(54) TUBE

(75) Inventors: Jan Ageheim, Lidingö; Thomas Andersson, Kungsör, both of (SE)

(73) Assignees: Kungsors Plast AB, Kungsors (SE); Petro Technik Ltd., Suffolk (GB)

( * ) Notice: Subject to any disclaimer, the term of this patent is extended or adjusted under 35 U.S.C. 154(b) by 0 days.

(21) Appl. No.: 08/244,163

(22) PCT Filed: Nov. 23, 1992

(86) PCT No.: PCT/SE92/00803

§ 371 Date: Jul. 14, 1994

§ 102(e) Date: Jul. 14, 1994

(87) PCT Pub. No.: WO93/09948

PCT Pub. Date: May 27, 1993

(30) Foreign Application Priority Data

Nov. 22, 1991 (SE) ................................ 9103472

(51) Int. Cl.$^7$ .................. B32B 27/08; B32B 27/32; B32B 27/34; B32B 27/36
(52) U.S. Cl. .................. 428/36.6; 428/35.7; 428/36.8; 428/36.9; 428/36.91; 428/476.3; 428/476.9; 428/483; 428/515; 428/516; 428/523; 138/137
(58) Field of Search .................. 428/34.1, 35.2, 428/35.4, 35.7, 36.6, 36.8, 36.9, 36.91, 323, 515, 516, 523, 483, 476.3, 476.9; 138/103, 104, 137; 73/40.5 R, 49.1; 362/215; 525/165, 177, 178, 184, 66, 63, 240, 313, 232

(56) References Cited

U.S. PATENT DOCUMENTS

| | | | | |
|---|---|---|---|---|
| 3,873,667 A | * | 3/1975 | Preto et al. .................. 254/234 |
| 4,196,464 A | * | 4/1980 | Russell .................. 361/215 |
| 4,264,490 A | * | 4/1981 | Berejka .................. 260/45.85 |
| 4,312,383 A | * | 1/1982 | Kleykamp .................. 138/103 |
| 4,758,455 A | * | 7/1988 | Campbell et al. .................. 428/36 |
| 4,814,379 A | * | 3/1989 | Flood et al. .................. 525/66 |
| 5,102,012 A | * | 4/1992 | Foster .................. 222/40 |
| 5,271,977 A | * | 12/1993 | Yoshikawa et al. .................. 428/35.9 |

FOREIGN PATENT DOCUMENTS

EP 0294181 12/1988

OTHER PUBLICATIONS

World Patent Index (Derwent), Accession No. 91–335718/46, JP 3224735, A, 911003, Oct. 1991.

* cited by examiner

*Primary Examiner*—Vivian Chen
(74) *Attorney, Agent, or Firm*—Pitney, Hardin, Kipp & Szuch LLP

(57) ABSTRACT

A tube of layered material consisting of a first layer and a second layer, for use in transporting and storage of hydrocarbons, wherein said first layer consists essentially of polyethylene or polypropylene, and wherein said second layer constitutes a barrier layer for reducing the diffusion outward through said tube of hydrocarbons transported or stored within said tube and comprises polyethylene or polypropylene in combination with any component selected from the group consisting of butyl rubber, polyamide, and polyester. The first and second layers of the tube are coextruded.

12 Claims, No Drawings

TUBE

The invention relates to tubes and containers for transport and storage of petrol and hydrocarbons of a type similar to petrol, typically for use in petrol station installations and other similar installations where petrol or. other hydrocarbons as i.a. kerosene, diesel oil, fuel oil, natural gas, LPG, or the likeare stored in tanks and from there supplied to e.g. the pumps in the filling station. Among the areas of usage for these tubes the following may be mentioned, pipes for venting and return of gases and other distributional areas.

In installations of the type referred to above it has been common to use galvanized tubes each having a length of 6 meters, which means that the tubes have to be joined together. A joint always represents a threat of leakage. This threat is heightened by the fact, that the weather changes during the seasons of the year, gives effects from movements in the ground which effects cannot be entirely avoided. It must of course be pointed out that even if the tubes are laid in the form of a continous hose of a plastic material, suitable for the application, the forces from the ground. movements remain, but on account of the inherent properties of the material the results of the existing forces may be. essentially eliminated. However the risk for leakage of hydrocarbons by diffusion remains.

The leakage from the tubes generally used for this purpose may approximately be estimated to 0.4 g/meter and month, i.e. 2,5 1/meter and year. This estimate refers to polyethene tubes of the usual types. In addition to polyethene tubes, also tubes of glass fiber reinforced plastic material is used.

The object of the invention is thus tubes or containers for transport and/or storing of petrol or hydrocarbons having similar properties, tubes manufactured from a material, said material being chemically compatible with said hydrocarbons and said material a reduced absorption as to transported or stored hydrocarbons. Moreover the tubes are diffussion resistant to such an extent that they may be installed in the ground with a higher degree of safety than the tubes existing up to now.

Generally speaking, most polyolefines may be used for transporting petrol bearing in mind that most of the polyolefines show resistance towards petrol to a greater or smaller extent. Among these are polyethene and polypropylene, which materials are chemically inert and which also show favourable properties when used in connection with hydrocarbons. The most common use in this context is fuel tanks for installation in cars, said tanks for more than ten years having been manufactured from polyethene.

However, the matrix of polyethene (i.e. the molecular network of the material) does not belong to the most diffusion resistant plastics, since through this material diffuses and in the material is absorbed certain amounts of solvents e.g. petrol. The thickness of the manufactured goods is of essential importance as are the sorrounding weather conditions, especially the temperature if the tube is installed above ground and if the tube is installed in the ground the effective factors are essentially the same. That different types of plastics show different permeability factors is well know in the art and this fact is used in various applications.

It is know in other fields of usage to coat tubes on the outside to hinder diffusion from the outside of gaseous elements or compounds into the tube, conf. e.g. the coating on the outside of water-pipes in order to hinder the admittance of oxygen to the circulating hot water in the radiator circuits.

It is also known to seal the inside of the fuel tanks in cars by laquering them in order to stop the petrol fumes from diffusing. This type of treatment can-for natural reasons not be applied to continous tubes.

A gaseous diffusion resistant article is know from EP,A, 2,0030091 comprising 3 layers, of which one is the intermediate layer so chosen as to be an adhesive for both the layers and such that said layer also compensates for the relative coefficients of linear expansion between the, intermediate layer and its adjoining layers. These tubes may be formed by co-extrusion. This tube is meant for central heating systems and they thus have to be able to stand for a vide variety of temperatures, much wider than the temperature range for the tubes according to the invention.

A number of documents showing examples of prior art in the relevant field are the following JP,A,2035290, JP,A, 3197034, JP,A,3224735.

The object of the invention is attained by the use of the tube according to the invention.

We have solved the above described problems by furnishing on the inside of a polyethene tube, said tube being of a conventional type for this purpose and which tube is made from polyethene of the type MD-PD (medium density polyethene), a barrier layer, compatible with both the polyethene and the hydrocarbons which are to be transported or stored. As the barrier layer polyethene or polypropylene maybe used. This layer also contains a second substance, which is chosen among polyamide, polyester and butyl rubber and which appear to be suitable substanses for this purpose. Ethylen alcohol and vinyl alcohol, such as EVOH and EVAL, are also suitable for this purpose This second substance is either blended into the polyethene of the type MD-PD (medium density polyethene) or is grafted onto the polyethene.

One example of a barrier layer according to the invention may be used. The barrier layer chosen may be e.g. HD-polyethene containing butylrubber having a composition where the butyl rubber component varies between 5 weight-% and 50 weight-% and a preferred amount is about 30 weight-%, and the remainder essentially is HD-polyethene, which may be cross-linked. Vi have found that when using percentages higher than 50-% processability problems occur and when using small additions the effects of the butyl rubber are lessened and the addition of less than 5% does not give a satisfactory action. This same proportions have shown to be working with the other substances mentioned above as the second substances mentioned above.

One important aspect of this invention is that there is no necessity of providing any form of extra layer or any kind of glue in between the two layers, i.e. the main layer and the barrier layer. The two layers may simply be co-extruded as they are compatible with each other.

The barrier material is an expensive material, which means that the use of the material is restricted to the amount necessary for obtaining the set goals. According to our opinion using a barrier layer having a thickness of 10–15% of the total material will decrease the diffusion to one tenth of the value usually encountered for used materials today. We have found that for practical reasons it is hard to make, the barrier layer thinner than 0.3 mm—a preferred thickness of the layer is 1 to 2 mm. To make a thicker layer than this does not add anything to the properties of the barrier layer and doing so would also intrude on the available space in the tube. The comparatively thin inner laster will not change the price drastically and the favourable experiences made in using polyethene in this context in a long term perspective are not changed since we are not exchanging material in the polyethene tube but are adding a small amount of material on the inside of the same. If instead we had chosen to put a layer on the outside of the tube all mechanical properties as as tensile strength of tube fittings i.a. would have to be tested and re-evaluated over a long period of time. By proceeding as above we are able without further testing and development use the fittings and such and moreover be certain that all of the standard values for the properties of the polyethene as a pressure tube will remain.

Transport of fluids and liquids through tubes gives rise to static electricity which always has to be led away. Within the art it is well known to add carbon black to the plastic material in order to make the plastic material conducting. The amount added depending on the quality of the carbon black and the intended area of use, i.e. the degree of conductivity which is required in order to obtain the desired results. A suitible value of resistivity in order to avoid static electricit seems to in the range of 5 to 500 ohm/cm. This component may be added to the main layer.

In order to additionally improve the safety in connection with this type of tube installations a type of leakage detector may be arranged lengthwise, as a narrow strip, on the tube in the form of conducting layer, which would allow the measuring of the amount of resistanse in the strip in a manner well know to the man skilled in the art. The mechanism behind this is that if the plastic material absorbs solvents it will swell and the mutual distances between the particles of carbon black will increase and as a consequence the resistance in the strip, which will give a clear indication as to solvents leaking from the tube.

To co-extrude this strip when forming the tube is extremely practical since the installation then will consist of one tube only instead of having an extra tube near the first one as today.

Comparative tests have been performed with tree types of polyethene tubes having diameters of 66 mm. The tubes consisting of a standard tube (1) of the type SA 1-1-2305-5, a tube (2) having a barrier layer of butyl-grafted HD-polyethene and a tube (3) having a barrier layer containing HD-polyethene blended with a thermoplastic polyester.

The tubes were filled with synthetic petrol in accordance with AB Svenska Anläggningsprovnings Technical Instruction TA 14-01. The petrol consisted of iso-octane 50%, toluene 30% and orto-xylene 20% all percentages by volume.

The tubes were weighed and burried in a box filled with gravel, except for the standard tube. The box measured 30×30×200 mm. The rest of the tubes, three, were kept in air. All test objects were kept at-room temperature. After 30 days following results were recorded:

| | Weight loss 30 days grams/meter in | |
|---|---|---|
| Sample | gravel | tube in air |
| 1 | — | 0.00 |
| 2 | 0.00 | 0.05 |
| 3 | 0.00 | 0,00 |

The tubes having a barrier layer of butyl-grafted HD-PD have also been tested as to pressure resistance and resistance in regards to chemicals. The tested tubes had a diameter of 66 mm and a wall-thickness of 5 m for the outer layer and of 1,2 mm for the barrier layer.

In pressure test (80° C., 170 hours according too SS 3362.7 and 0.8) on tubes having a lenght of 400 mm following results were recorded.

| | Mean outer | Total Thickness | | | | Time of |
|---|---|---|---|---|---|---|
| Sample | diameter mm | min mm | max mm | MPa | P MPa | rupture hours |
| 1 | 66.4 | 6.50 | 7.00 | 4.6 | 0.749 | >170 |
| 2 | 66.4 | 6.40 | 7.10 | 4.6 | 0.749 | >170 |
| 3 | 66.4 | 6.40 | 7.10 | 4.6 | 0.749 | >170 |
| 4 | 66.4 | 6.30 | 7.10 | 4.6 | 0.749 | >170 |
| 5 | 66.4 | 6.50 | 7.00 | 4.6 | 0.749 | >170 |

The test pressure (P) is calculated for a wall thickness of 5.00 mm which relates to the part of the wall thickness of the tube which is not the barrier layer.

Axial deformation was measure on 3 samples and following results were recorded.

| | Axial deformation | |
|---|---|---|
| Sample | Change of length in % | Mean value −1.1 Demande ±3 |
| 1 | −1.0 | |
| 2 | −1.0 | |
| 3 | −1.2 | |

A tensile test was also performed on 3 samples.

Tensile test +23° C.

| Rate of pulling 25 mm/min | |
|---|---|
| Sample | kN |
| 1 | 9.9 |
| 2 | 9.7 |

A tensile test was also performed on pieces of tube material which had been kept in a temperature of +80° C. The pieces were mill to a thickness of 1 mm having the inside of the tube wall unharmed. Test specimens were cut as a test bar according to DIN 53455. Four specimens ware kept for 14 days at −23° C. in a liquid consisting of one part synthetic petrol (as below) and one part methanol.

The synthetic petrol consisted of:

60 parts iso-octane 5 parts benzene 20 parts toluene 15 parts of o-xylene

The specimens were weighed immediatly before and after the above procedure.

| Specimen | Weight change % | Yield point MPa | Elongation at yield point % |
|---|---|---|---|
| Non-treated | | | |
| 1 | — | 14.7 | 2.0 |
| 2 | — | 15.1 | 1.4 |

-continued

| Specimen | Weight change % | Yield point MPa | Elongation at yield point % |
|---|---|---|---|
| 3 | — | 15.3 | 1.6 |
| 4 | — | 15.2 | 1.4 |
| 5 | — | 14.7 | 1.6 |
| Mean value | — | 15.0 | 1.6 |
| Treated | | | |
| 6 | 15.1 | 13.5 | 4.0 |
| 7 | 15.0 | 13.3 | 3.8 |
| 8 | 15.0 | 13.4 | 3.8 |
| 9 | 15.2 | 13.3 | 3.8 |
| 10 | 15.0 | 13.0 | 4.0 |
| Mean value | 15.1 | 13.3 | 3.9 |
| Change in % | +15.1 | −11 | +144 |

Pressure test

A tube was supplied with fittings and then placed in a water bath at 20° C. and a pressure of 25 bar was applied. After one hour the test was interrupted and the tube had not burst.

The tube described above was made by co-extrusion of the two layers. It is of course not quite impossible to apply the barrier layer onto the inside of the tube after the tube has been extruded.

But since the tubes are to be produced in the form of continuous tubes co-extrusion seems to be the most appropriate way of manufacture.

In the manufacture of containers for storage or parts having bigger dimensions than the herein described tubes the barrier layer may of course be applied to the finished articles.

The invention has been described with referens to test-samples. It is of course possible to modify the invention within the scope of the appended claims.

What is claimed is:

1. A tube of layered material consisting of a first layer and a second layer characterized in that said first layer consists essentially of a material selected from the group consisting of polyethylene and polypropylene, and said second layer, constituting a barrier layer for reducing the diffusion outward through said tube of hydrocarbons transported or stored within said tube, comprises a material selected from the group consisting of polyethylene and polypropylene in combination with any of the components selected from the group of components consisting of butyl rubber, polyamide and polyester, said first layer and said second layer being coextruded with each other.

2. Tube according to claim 1, characterized in that the second layer has a thickness of 1 mm to 2 mm.

3. Tube according to claim 1, characterized in that the second layer consists of a blend of polyethylene or polypropylene and one of said components selected from said group of components.

4. Tube according to claim 1, characterized in that the second layer is placed on the inside wall of the tube.

5. Tube according to claim 1, characterized in that the second layer comprises a blend of polyethylene or polypropylene, and one of said components selected from said group of components, whereby the added amount of said one of said components is in a range from 5 to 50 weight-% as related to the weight of the polyethylene or polypropylene.

6. Tube according to claim 1, characterized in that the second layer comprises a blend of polyethylene or polypropylene, and butyl rubber, whereby the added amount of butyl rubber is 30 weight-% as related to the weight of the polyethylene or polypropylene.

7. Tube according to claim 1, characterized in that an amount of an electrically conducting substance is added to said first layer in order to avoid static electricity building up.

8. Tube according to claim 1, characterized in that the second layer has a thickness of 10 to 15% of the total thickness of the tube.

9. Tube according to claim 1, characterized by an electrically conducting strip of plastic being arranged along the total lenght of the tube.

10. Tube according to claim 1, characterized in said first layer consists essentially of medium density polyethylene.

11. Tube according to claim 1, characterized in said second layer comprises high density polyethylene.

12. Tube according to claim 1, characterized in that said second layer comprises polyethylene in combination with polyamide.

* * * * *